(12) United States Patent
Nielsen et al.

(10) Patent No.: US 12,229,619 B2
(45) Date of Patent: Feb. 18, 2025

(54) METHOD AND SYSTEM FOR BACKSCATTER COMMUNICATION USING PRE-DEFINED TEMPLATES

(71) Applicant: HaiLa Technologies Inc., Montréal (CA)

(72) Inventors: Peter Østergaard Nielsen, Ishøj (DK); Ole Christian Andersen, Belmont, CA (US)

(73) Assignee: HaiLa Technologies Inc., Montreal (CA)

( * ) Notice: Subject to any disclaimer, the term of this patent is extended or adjusted under 35 U.S.C. 154(b) by 153 days.

(21) Appl. No.: 18/102,545

(22) Filed: Jan. 27, 2023

(65) Prior Publication Data

US 2023/0244883 A1   Aug. 3, 2023

Related U.S. Application Data

(60) Provisional application No. 63/304,320, filed on Jan. 28, 2022.

(51) Int. Cl.
*G06K 7/10* (2006.01)
*H04B 7/22* (2006.01)

(52) U.S. Cl.
CPC ........... *G06K 7/10079* (2013.01); *H04B 7/22* (2013.01)

(58) Field of Classification Search
CPC .............................. G06K 7/10079; H04B 7/22
See application file for complete search history.

(56) References Cited

U.S. PATENT DOCUMENTS 9,680,520 B2 *  6/2017  Gollakota ................ H04B 1/40
9,973,367 B2     5/2018  Gollankota et al.
(Continued)

FOREIGN PATENT DOCUMENTS

CN        111342855 A  *  6/2020  ............... H04B 1/16

OTHER PUBLICATIONS

Zhang, M et al., "Practical Backscatter with Commodity BLE", ICC 2021—IEEE International Conference on Communications, Montreal, QC, Canada, Jun. 14-23, 2021 (Year: 2021).*

(Continued)

*Primary Examiner* — Curtis A Kuntz
*Assistant Examiner* — James E Munion
(74) *Attorney, Agent, or Firm* — SMART & BIGGAR LP; Isis E. Caulder; Sunil R. Rao

(57) ABSTRACT

Various embodiments herein relate to methods and systems for backscatter communication using pre-defined templates. In accordance with at least one embodiment, there is provided a backscattering communication system, comprising a transmitting unit, a backscattering tag, and a receiving unit. The transmitting unit is configured to transmit a signal comprising a transmitted frame including a pre-defined data payload. The backscattering tag is configured to: receive, from the transmitting unit, the signal comprising the transmitted frame; encode tag data over the pre-defined data payload to generate a modified data payload; and transmit a backscattered signal comprising a backscattered frame including the modified data payload. The receiving unit is configured to: receive, from the backscattering tag, the backscattered signal; and decode the modified data payload, in the backscattered frame, to recover the tag data, wherein the decoding is based on prior knowledge of the receiving unit of the pre-defined data payload.

16 Claims, 5 Drawing Sheets

(56) References Cited

U.S. PATENT DOCUMENTS

| | | | |
|---|---|---|---|
| 9,979,240 | B2 | 5/2018 | Parks et al. |
| 10,033,424 | B2 | 7/2018 | Gollankota et al. |
| 10,079,616 | B2 | 9/2018 | Reynolds et al. |
| 10,270,639 | B2 | 4/2019 | Gollankota et al. |
| 10,338,205 | B2 | 7/2019 | Zhang et al. |
| 10,382,161 | B2 | 8/2019 | Gollankota et al. |
| 10,383,126 | B2 | 8/2019 | Gollankota et al. |
| 10,447,331 | B2 | 10/2019 | Gollankota et al. |
| 10,587,445 | B2 | 3/2020 | Gollankota et al. |
| 10,652,073 | B2 | 5/2020 | Talla et al. |
| 10,812,130 | B2 | 10/2020 | Talla et al. |
| 10,873,363 | B2 | 12/2020 | Gollankota et al. |
| 10,951,446 | B2 | 3/2021 | Kellogg et al. |
| 11,133,717 | B2 | 9/2021 | Reynolds et al. |
| 11,159,059 | B2 | 10/2021 | Gollankota et al. |
| 11,171,678 | B2 | 11/2021 | Hoang et al. |
| 11,212,479 | B2 | 12/2021 | Gollakota et al. |
| 2016/0266245 | A1 | 9/2016 | Bharadia et al. |
| 2019/0274144 | A1 | 9/2019 | Zhang et al. |
| 2020/0236571 | A1* | 7/2020 | Lopez ................ H04L 27/2042 |
| 2021/0359754 | A1 | 11/2021 | Talla et al. |

OTHER PUBLICATIONS

Jinhwan Jung et al., "Gateway over the Air: Towards Pervasive Internet Connectivity for Commodity IoT", MobiSys 2020, Association for Computing Machinery, Toronto, ON, Canada, Jun. 15-19, 2020 (Year: 2020).*

International Search Report and Written Opinion mailed Mar. 22, 2023 in International Patent Application No. PCT/CA2023/050109 (9 pages).

Yuan, L. et al., "SubScatter: Sub-symbol WiFi Backscatter for High Throughput", 2022 IEEE 30th International Conference on Network Protocols (ICNP), Lexington, KY, USA, Oct. 30-Nov. 2, 2022. p. 1-11.

Zhang, M. et al., "Practical Backscatter with Commodity BLE", ICC 2021-IEEE International Conference on Communications, Montreal, QC, Canada, Jun. 14-23, 2021, p. 1-6.

Iyer, V. et al., "Inter-Technology Backscatter: Towards Internet Connectivity for Implanted Devices", SIGCOMM' 16, Florianopolis, Brazil, Aug. 22-26, 2016 [Retrieved from the Internett on Mar. 17, 2023] Retrieved from URL: https://dl.acm.org/doi;pdf/10.1145/2934872.2934894.

Jung, J. et al., "Gateway over the Air: Towards Pervasive Internet Connectivity for Commodity IoT", MobiSys'20, Toronto, Canada, Jun. 15-19, 2020 [Retrieved from the Internet on Mar. 17, 2023] Retrieved from URL: https://dl.acm.org/doi/pdf/10.1145/3388949.

* cited by examiner

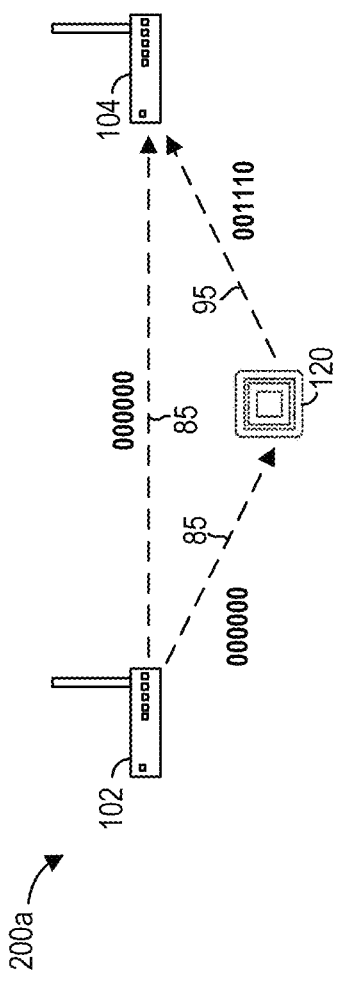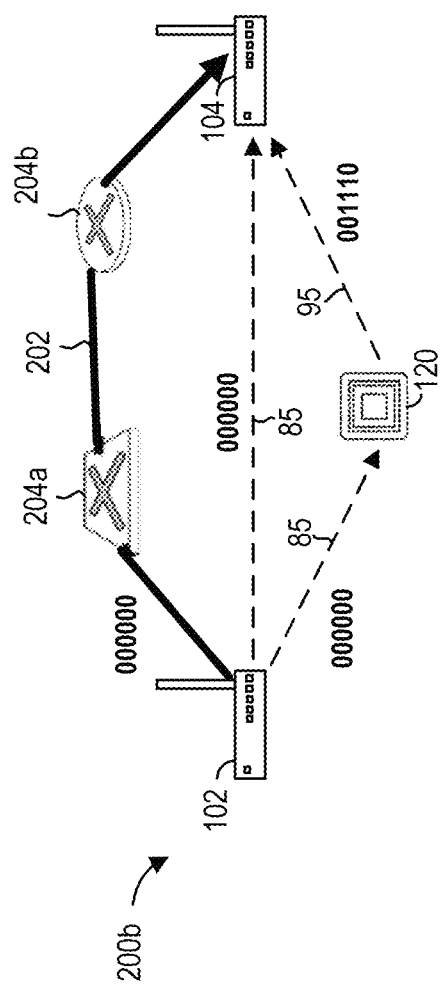

METHOD AND SYSTEM FOR BACKSCATTER COMMUNICATION USING PRE-DEFINED TEMPLATES

FIELD

The present subject-matter relates to backscatter communication systems and backscattering tags, and more particularly to a method and system for backscatter communication using pre-defined templates.

INTRODUCTION

Backscatter communication has attracted interest for applications such as implantable sensors, wearables, and smart home sensing because of its ability to offer low power connectivity to these sensors. Such applications have severe power constraints. Implantable sensors for example have to last for years, while even more traditional smart home monitoring applications may benefit from sensors and actuators that can last several years. Backscatter communication can satisfy the connectivity requirements while consuming such low power as to be energized by harvesting energy, or with batteries that could last several years.

Current backscatter systems require specialized hardware to generate the excitation RF signals that backscatter radios can reflect, as well as to decode the backscattered signals. Recent research such as Wi-Fi backscatter to BackFi and passive Wi-Fi have reduced the need for specialized hardware. Passive Wi-Fi for example can decode using standard Wi-Fi radios, however it still requires a dedicated continuous wave signal generator as the excitation RF signal source. BackFi needs a proprietary full duplex hardware add-on to Wi-Fi radios to enable backscatter communication. Consequently, a need continues to exist for a backscatter system that can be deployed using commodity devices such as access points, smartphones, watches and tablets

SUMMARY OF THE VARIOUS EMBODIMENTS

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

In one broad aspect, there is provided a backscattering communication system, comprising a transmitting unit, a backscattering tag, and a receiving unit. The transmitting unit is configured to transmit a signal comprising a transmitted frame including a pre-defined data payload. The backscattering tag is configured to: receive, from the transmitting unit, the signal comprising the transmitted frame; encode tag data over the pre-defined data payload to generate a modified data payload; and transmit a backscattered signal comprising a backscattered frame including the modified data payload. The receiving unit is configured to: receive, from the backscattering tag, the backscattered signal; and decode the modified data payload, in the backscattered frame, to recover the tag data, wherein the decoding is based on prior knowledge of the receiving unit of the pre-defined data payload.

In some embodiments, the tag data includes sensor data generated by a sensor coupled to the backscattering tag.

In some embodiments, the system further comprises a backbone network path, and the prior knowledge of the receiving unit of the pre-defined data payload is based on data received from the transmitting unit via the backbone network path.

In some embodiments, the receiving unit includes a memory unit, and the prior knowledge of the receiving unit of the pre-defined data payload is based on data stored in the memory unit.

In some embodiments, the transmitted frame includes a frame header configured to indicate whether the transmitted frame includes the pre-defined data payload.

In some embodiments, the backscattering tag is configured to encode the tag data by modifying a frequency of the signal received from the transmitting unit.

In some embodiments, the transmitting unit is configured to transmit the signal on a first frequency channel, the backscattering tag is configured to transmit the backscattered signal on a second frequency channel separate from the first frequency channel, and the receiving unit is configured to receive the backscattered signal on the second frequency channel.

In some embodiments, the backscattering tag is configured to encode the tag data by modifying an amplitude or a phase of the signal received from the transmitting unit.

In another broad aspect, there is provided a backscattering tag configured to: receive, from a transmitting unit, a transmitted signal comprising a transmitted frame with a pre-defined data payload; encode tag data over the pre-defined data payload to generate a modified data payload; and transmit, to a receiving unit, a backscattered signal comprising a backscattered frame comprising the modified data payload. The receiving unit is configured to decode the modified data payload to recover the tag data, wherein the decoding is based on prior knowledge of the receiver of the pre-defined data payload.

In another broad aspect, there is provided a method for backscattered communication. The method comprises: transmitting, by a transmitting unit, a signal comprising a transmitted frame including a pre-defined data payload; backscattering, using a backscattering tag device, the signal, wherein the backscattering includes: receiving, from the transmitting unit, the signal comprising the transmitted frame; encoding tag data over the pre-defined data payload to generate a modified data payload; and transmitting a backscattered signal comprising a backscattered frame including the modified data payload; receiving, by a receiving unit, the backscattered signal; and decoding, by the receiving unit, the modified data payload, in the backscattered frame, to recover the tag data, wherein the decoding is based on prior knowledge of the receiving unit of the pre-defined data payload.

In some embodiments, the tag data includes sensor data generated by a sensor coupled to the backscattering tag.

In some embodiments, the prior knowledge of the receiving unit of the pre-defined data payload is based on data received from the transmitting unit via a backbone network path.

In some embodiments, the prior knowledge of the receiving unit of the pre-defined data payload is based on data stored in a memory unit of the receiving unit.

In some embodiments, the transmitted frame includes a frame header configured to indicate whether the transmitted frame includes the pre-defined data payload.

In some embodiments, the backscattering includes encoding the tag data by modifying a frequency of the signal received from the transmitting unit.

In some embodiments, the transmitting unit transmits the signal on a first frequency channel, the backscattering tag transmits the backscattered signal on a second frequency channel separate from the first frequency channel, and the receiving unit receives the backscattered signal on the second frequency channel.

In some embodiments, the backscattering tag encodes the tag data by modifying an amplitude or a phase of the signal received from the transmitting unit.

In another broad aspect, there is provided a method for backscattered communication. The method comprises: receiving, by a backscattering tag from a transmitting unit, a transmitted signal comprising a transmitted frame including a pre-defined data payload; encoding, by the backscattering tag, tag data over the pre-defined data payload to generate a modified data payload; and transmitting, by the backscattering tag to a receiving unit, a backscattered signal comprising a backscattered frame including the modified data payload, the receiving unit being configured to decode the modified data payload to recover the tag data, wherein the decoding is based on prior knowledge of the receiver of the pre-defined data payload.

Other features and advantages of the present application will become apparent from the following detailed description. It should be understood, however, that the detailed description and the specific examples, while indicating embodiments of the application, are given by way of illustration only and the scope of the claims should not be limited by these embodiments, but should be given the broadest interpretation consistent with the description as a whole.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which:

FIG. 2A is a simplified illustration of an example embodiment of a backscatter communication system, in accordance the teachings provided herein;

FIG. 2B is a simplified illustration of another example embodiment of a backscatter communication system, in accordance the teachings provided herein;

Figure 1A:
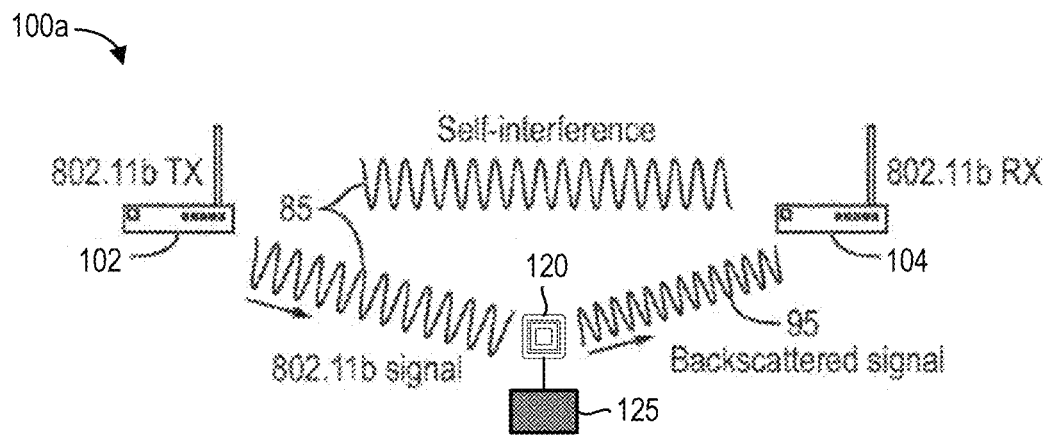
FIG. 1A is a simplified illustration of a backscatter communication system, in accordance with some example embodiments.

Further aspects and features of the example embodiments described herein will appear from the following description taken together with the accompanying drawings.

DESCRIPTION OF VARIOUS EMBODIMENTS

It will be appreciated that, for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein.

Furthermore, this description is not to be considered as limiting the scope of the embodiments described herein in any way but rather as merely describing the implementation of the various embodiments described herein.

In the description and drawings herein, reference may be made to a Cartesian co-ordinate system in which the vertical direction, or z-axis, extends in an up and down orientation from bottom to top. The x-axis extends in a first horizontal or width dimension perpendicular to the z-axis, and the y-axis extends cross-wise horizontally relative to the x-axis in a second horizontal or length dimension.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise.

The terms "a," "an" and "the" mean "one or more," unless expressly specified otherwise.

As used herein and in the claims, two or more parts are said to be "coupled", "connected", "attached", or "fastened" where the parts are joined or operate together either directly or indirectly (i.e., through one or more intermediate parts), so long as a link occurs. As used herein and in the claims, two or more parts are said to be "directly coupled", "directly connected", "directly attached", or "directly fastened" where the parts are connected in physical contact with each other. As used herein, two or more parts are said to be "rigidly coupled", "rigidly connected", "rigidly attached", or "rigidly fastened" where the parts are coupled so as to move as one while maintaining a constant orientation relative to each other. None of the terms "coupled", "connected", "attached", and "fastened" distinguish the manner in which two or more parts are joined together.

Embodiments herein provide a system and method of backscattered communication that is complaint with existing communications protocols, such as Wi-Fi 802.11g/n, Bluetooth®, and ZigBee. To this end, it will be noted that, while for simplicity and ease of description, embodiments herein reference communication via 802.11b compliant Wi-Fi frames, the described embodiments are not so limited such that the disclosed backscatter communication systems may operate with other similar communication standards.

Reference is made to FIG. 1A, which is a simplified view of a backscatter communication system 100a according to some embodiments.

As shown, the system 100a generally includes a transmitting unit 102, a receiving unit 104 and a backscattering tag 120. It will be understood that, in some embodiments, one or more of the transmitting and receiving units may in-fact comprise a device with combined transmitting and receiving functionalities.

As shown, the transmitter 102 is configured for transmitting 802.11b compliant Wi-Fi frames 85 at a pre-defined frequency. To this end, the transmitter 102 may also be referred to herein as an "excitation device", and the transmitted signal 85 may also be referred to herein as an "excitation signal". Transmitter 102 can comprise, for example, a mobile phone with a standard Wi-Fi radio (as shown FIG. 1B). In other cases, transmitter 102 may be any other device configured to communicate via a Wi-Fi radio. In turn, receiver 104 is tuned to a pre-defined frequency (i.e., that may or may not be the same as that of the transmitter 102) to receive the Wi-Fi frames 85. In some cases, the receiver 104 can comprise, for example, a Wi-Fi access point, or any other suitable reception device.

As further shown, backscattering tag 120 operates to intercept the Wi-Fi frames 85 being transmitted to the receiver 104. In particular, tag 120 is configured to manipulate the intercepted frames so to encode its own data information onto the Wi-Fi frames. Tag 120 may backscatter a signal 95 comprising frames having the tag's own data modifying the original data payload, i.e., the data payload transmitted by the transmitter 102.

In more detail, tag 120 receives one or more frames in signal 85 containing the payload transmitted by the transmitter 104. Tag 120 is then operable to manipulate the payload data to encode its own data. This process, of encoding the tag's own data over pre-existing data in signal 85, is also known as "dirty paper encoding".

Tag 120 may apply various different methods to manipulate the incident packet to generate the backscattered signal. For example, as described in U.S. Pat. No. 10,338,205 to Zhang et al, filed Aug. 14, 2017 and issued Jul. 2, 2019; and United States Publication No. 2019/0274144 to Zhang et al, filed Apr. 25, 2019, both of which are hereby incorporated in their entirety by reference, a code word translation scheme can be used. The codeword translation may involve, for example, XOR'ing the data bits in the original transmitted payload (i.e., signal 85), with the tag's data, to generate the backscattered signal. In practice, codeword translation is performed by modifying, for example, one of the amplitude, phase or frequency of the incident excitation signal 85.

To this end, backscattering tag 120 can include various passive circuitry components that operate on the received signal 85 in order to encode (i.e., manipulate) the signal 85 with the tag's own data. Various architectures and configurations for the passive circuitry for backscattering tags are known in the art.

The tag's own data, which is encoded by the tag 120, can vary based on the application of system 100*a*. For instance, in at least one example application, the tag data can comprise sensor data generated by a sensor system 125 coupled to the tag 120. In this manner, and as stated in the background, backscattering tag 120 can facilitate implementation of ultra low-power sensor networks.

With continued reference to FIG. 1A, in the system 100*a*, the backscattered signal 95 is in the same frequency channel as the original excitation signal 85. In turn, the receiver 104 receives both the original signal 85, as well as the backscattered signal 95, on a single frequency channel. Receiver 104 is then configured to process the data in the backscattered signal 95 such as to decode and isolate (i.e., disentangle) the tag's own data from the original transmitted data. In other cases, the decoding is performed by an external device connected to the receiver 104 (i.e., a decoding block 150).

Here as well, various example methods for decoding and recovering the tag's own data will occur to the skilled artisan. For example, as described in U.S. Pat. No. 10,338, 205 to Zhang et al and United States Publication No. 2019/0274144 to Zhang et al—the decoding may involve reversing the XOR operation performed by the tag 120, and using an XOR decoder. The XOR decoder XOR's the bits in the data payload of the backscattered signal 95 with the bits in the data payload of the original signal 85 to recover the data bits associated with the tag's data.

In view of the foregoing, it has been appreciated that there are a number of significant drawback to the system 100*a*. For example, the ability of the receiver 104 to decode the backscattered signal is often degraded by the interference generated by receiving signals 85, 95 in the same frequency channel. At least for this reason, the receiver 104 may be unable to distinguish between the original transmitted signal 85 and the backscattered signal 95. In turn, the receiver 104 is unable to effectively recover the tag's data by, for example, XOR'ing the data bits in the original signal 85 with the backscattered signal 95.

Figure 1B:
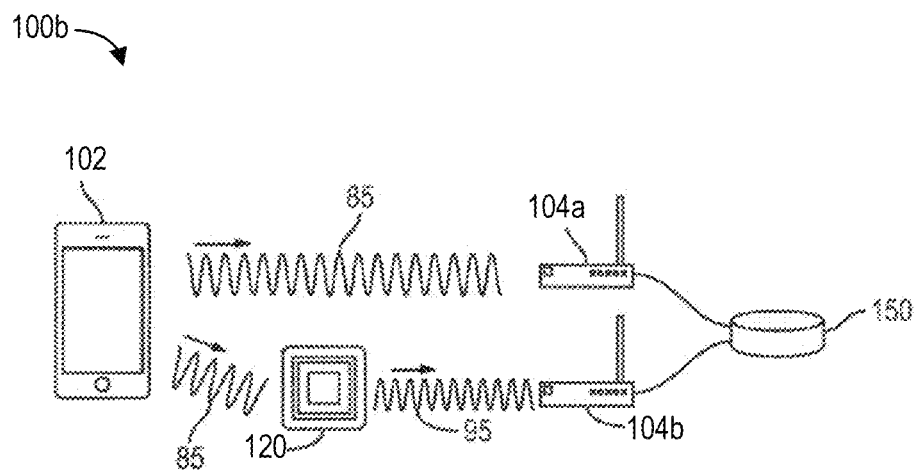
FIG. 1B is a simplified illustration of a backscatter communication system, in accordance with some other example embodiments.

Reference is now made to FIG. 1B, which is a simplified view of a backscattering communication system 100*b*, in accordance with some other embodiments To at least partially mitigate the above-noted challenges inherent in system 100*a*, system 100*b* includes two receivers 104*a* and 104*b*. Each receiver 104*a*, 104*b* is tuned to listen (i.e., receive) frames on a separate frequency channel.

In this embodiment, transmitter 102 transmits frames 85 on a first frequency channel. Receiver 104*a* is, in turn, tuned to the first frequency channel to receive signal 85. In contrast, however, to system 100*a*—in addition to encoding the backscatter data—tag 120 is also further configured to frequency shift the backscattered signal 95 onto a different frequency. In this manner, tag 120 generates a frequency-shifted backscattered signal 95 which is compatible with the 802.11b standard. Second receiver 104*b* is then tuned to the second frequency channel to receive backscattered signal 95.

Decoding block 150 receives the original frames 85 from the first receiver 104*a*, as well as the backscattered frames 95 from the second receiver 104*b*, and proceeds to recover the tag's data in a manner analogous to that described in system 100*a*. For instance, the decoding block 150 can comprise an XOR block that performs an XOR operation on the payload included in the two frames (i.e., frames in signals 85 and 95) to recover the tag's data.

Various embodiments for implementing the system 100*b* are also described in detail in U.S. Pat. No. 10,338,205 to Zhang et al and United States Publication No. 2019/0274144 to Zhang et al.

In view of the above, the system 100*b* is believed to mitigate at least some of the drawbacks associated with the system 100*a*. Namely, by frequency-shifting the backscattered signal 95 to an adjacent frequency channel, there is less interference between the backscattered signal 95 and the original signal 85.

Still yet, the inventors have appreciated that system 100*b* still suffers from a number of important drawbacks. For example, system 100*b* relies on a minimum of two receivers 104*a*, 104*b* for effective functioning. System 100*b* cannot otherwise function using a single receiver, tuned to a single frequency. This, in turn, adds a layer of hardware cost to implementing system 110*b*.

In view of the foregoing, embodiments herein attempt to mitigate drawbacks of each the systems 100*a* and 100*b*, and provide for a backscatter communication system which enables use of a backscattering tag with only a single receiver.

In more detail, and as provided in greater detail herein, the disclosed embodiments allow for the transmitting device 102 to transmit—at pre-defined time or frequency interval— frames having pre-defined templates of payload data. That is, the payload data template is pre-defined in that it is known, apriori, to the receiver 104 (i.e., it is pre-defined from the receiver's perspective). In this manner, the receiver 104 (or the decoding device) is not required to rely on the data in the originally transmitted signal 85 in order to decode the backscattered signal 95.

Reference is now made to FIG. 2A, which illustrates an example embodiment of a backscatter communication system 200a, in accordance with embodiments provided herein.

As shown, the backscatter system 200a is generally analogous to the backscatter system 100a, in that system 200a comprises the transmitting device 102, a single receiver 104, and one or more backscattering tags 120. Further, analogous to system 100a—but in contrast to system 100b—the backscattered signal 95 in system 200a may be transmitted on the same, or a different, frequency channel as the original signal 85.

To remove the need for two receivers as in 100b, the system 200a relies on transmitter 102 transmitting frames 85 carrying pre-defined payload data templates. These payload are known in advance to the receiver 104. For instance, in the exemplified embodiment, the transmitter 102 may transmit a packet having an all "0" payload (i.e., "000000").

Similar to system 100a, backscattering tag 120 may receive the frames in signal 85, and may encode its own data onto the packet payload. Tag 120 then backscatters the combined resulting packet for reception by receiver 104. In at least some embodiments, tag 120 may also frequency-shift the backscattered signal 95 using passive circuitry components and methodologies as described in U.S. Pat. No. 10,338,205 to Zhang et al and United States Publication No. 2019/0274144 to Zhang et al. This can be done to avoid interference between the backscattered signal 95 and the original signal 85, as previously explained.

At the receiver side, receiver 104 recovers the tag's data based on the apriori knowledge of the pre-defined template payload. For example, receiver 104 may XOR the backscattered data payload with the known pre-defined template data payload, to recover the tag's data. In cases where the tag 120 frequency-shifts the backscattered signal 95, the receiver 104 may also tune into the frequency of signal 95, rather than original signal 85.

In this manner, system 200a can be distinguished from system 100a, at least in that receiver 104 relies on its apriori knowledge of the payload in signal 85 to recover the tag's data. That is, the receiver's knowledge of the payload is not based, or contingent, on receiving signal 85. Accordingly, receiving signal 85 is not essential to enable the receiver 104 to decode the tag's data. For this reason, in cases were the tag 120 frequency shifts the backscattered signal 95, the receiver 104 can simply tune into the frequency shifted channel, and simply tune out of the frequency channel associated with original signal 85. In this manner, system 200a can operate using only a single receiver 104, tuned to a single frequency channel at a given time.

As stated previously, in order to effect the system 200b, the receiver 104 requires advanced knowledge of the data payload transmitted by transmitter 102. Various methods are contemplated to inform the receiver 104, of the pre-defined payload template, in advance.

For instance, in at least one example embodiment, transmitter 102 may be configured to always transmit the same template payload. Receiver 104, in turn, may then be externally configured to store this pre-defined template, i.e., in a memory of the receiver 104.

In another example embodiment, an initiation sequence between the transmitter 102 and the receiver 104 can enable the transmitter 102 to communicate the pre-defined template to the receiver 104. For instance, as illustrated in the system 200b of FIG. 2B, a backbone network path 202 is provided. Backbone path 202 can comprise, for example, one or more switches 204a and/or routers 204b connecting the transmitter 102 to the receiver 104. As such, backbone path 202 can be used for an initiation sequence, in which the transmitter 102 communicates (directly or in-directly) the content of the packet payload to the receiver 104 in advance. An advantage of this system configuration is that the template payload may be dynamically varied by the transmitter 102, insofar as the transmitter 102 is able to communicate the new pre-defined template payload in advance to the receiver 104, via the backbone path 202.

In still another example embodiment, the transmitter 102 can generate a frame that contains, in the frame header, a code indication reference of the pre-defined payload. That is, the header of the frame carrying the original data payload template can contain some code referring to the known template being used. In turn, receiver 104 can receive the frame in the backscattered signal 95, and can extract the unmodified header to determine the nature of the pre-defined template.

Figure 2C:
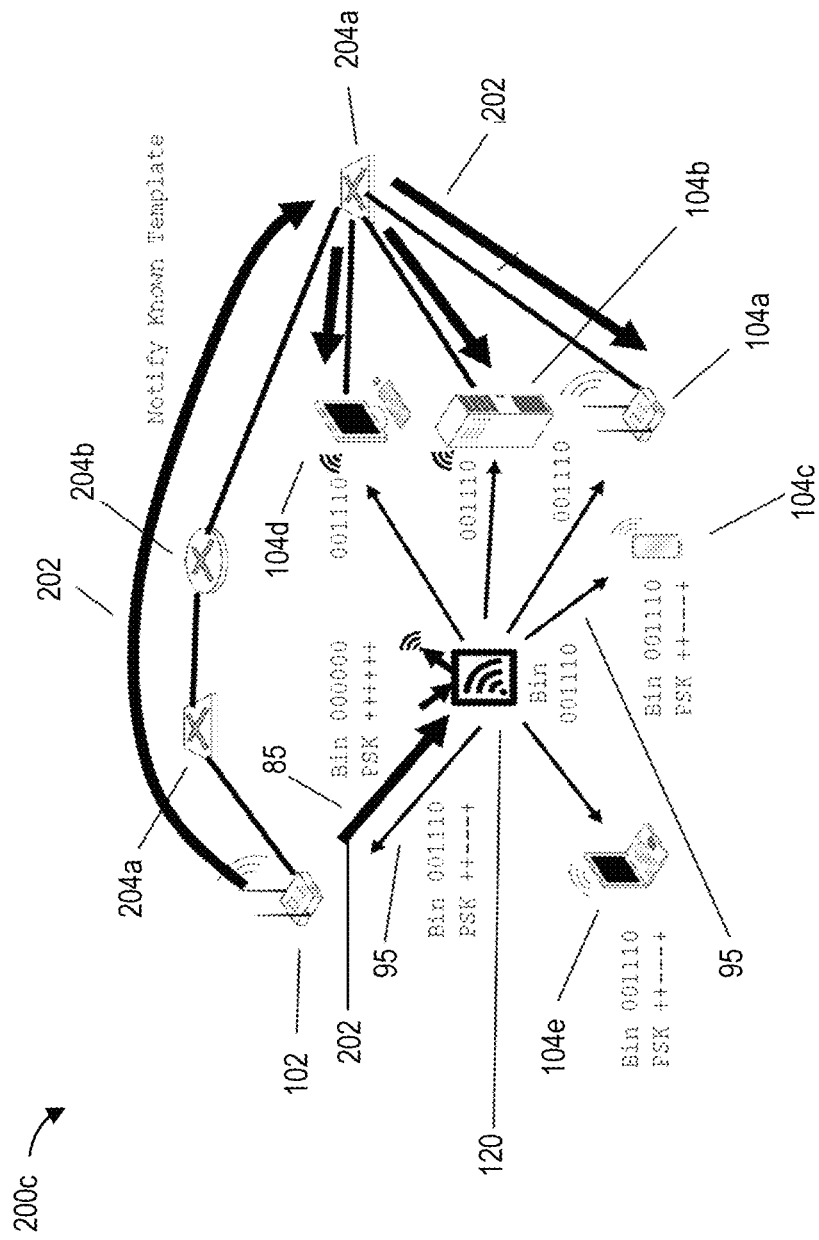
FIG. 2C is a simplified illustration of another example embodiment of a backscatter communication system, in accordance the teachings provided herein.
Figure 2D:
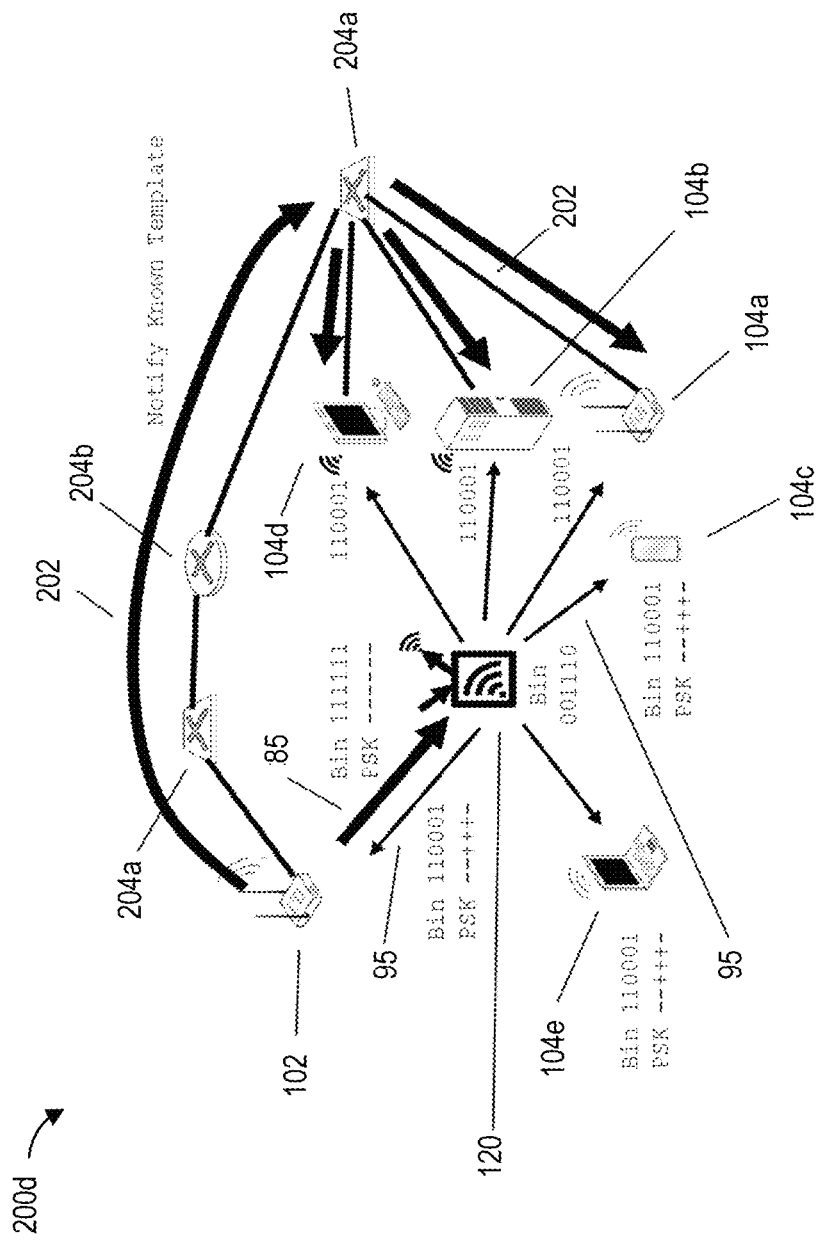
FIG. 2D is a simplified illustration of another example embodiment of a backscatter communication system, in accordance the teachings provided herein.

Referring now to FIGS. 2C and 2D, which illustrate other example embodiments of a backscatter communication system 200c and 200d, respectively.

Backscatter systems 200c and 200d operate using the same principles as the backscattering system 200b, with the exception that multiple receivers 104a-104e are provided. For example, the multiple receivers 104 can include a wireless LAN Access Point (WLAN AP) 104a, a server 104b, a smartphone 104c, a host 104d and a mobile computer 104e. In this embodiment, the backscattered signal 95 may be received by one or more of the plurality of receivers 104. Accordingly, each of the receivers 104 may have advanced knowledge of the pre-defined template transmitted by transmitter 102.

To this end, in the system 200c, the pre-defined template comprises an all-zero payload (i.e., "000000"), while in the system 200d the pre-defined template comprises an all-one payload (i.e., "11111"). In each example, an example phase shift key (PSK) modulation scheme is used by the tag 102 to encode the tag's data onto the original payload data.

Figure 3:
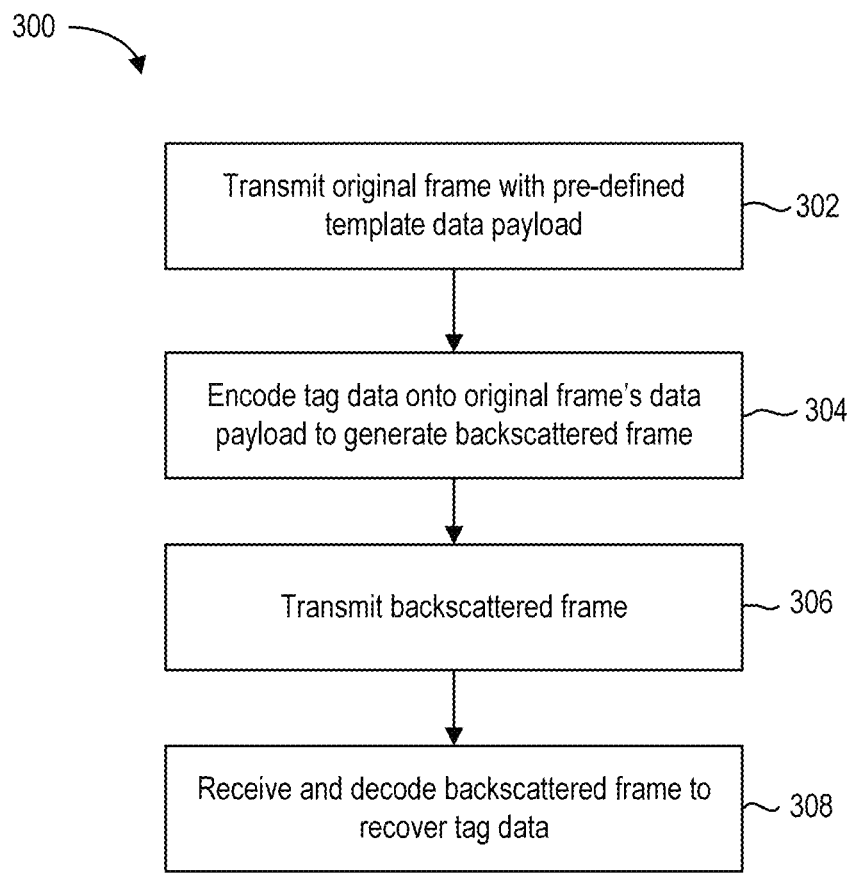
FIG. 3 is a process flow for an example embodiment of a method for backscatter communication.

Reference is now made to FIG. 3, which shows a process flow for an example embodiment of a method 300 for backscatter communication, in accordance with some embodiments.

As shown, at 302, transmitter 102 can transmit a frame having a pre-defined template for its data payload. At 304, the backscattering tag 120 can receive the packet, and can generate a backscattered frame by encoding the tag's own data over the payload data in the received frame. At 306, the backscattering tag 120 can transmit the backscattered frame. At 308, the receiver 104 can receive and decode the data in the backscattered frame to recover the tag's own data. As explained previously, this can be performed based on the receiver's advanced knowledge of the payload of the original packet generated by transmitter 102.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A backscattering communication system, comprising:
   a transmitting unit configured to transmit a signal comprising a transmitted frame including a pre-defined data payload;
   a backscattering tag configured to:
      receive, from the transmitting unit, the signal comprising the transmitted frame;
      encode tag data over the pre-defined data payload to generate a modified data payload; and
      transmit a backscattered signal comprising a backscattered frame including the modified data payload;
   a receiving unit that includes a memory unit, the receiving unit configured to:
      receive, from the backscattering tag, the backscattered signal; and
      decode the modified data payload, in the backscattered frame, to recover the tag data, wherein the decoding is based on prior knowledge of the receiving unit of the pre-defined data payload, the prior knowledge being based on data stored in the memory unit.

2. The system of claim 1, wherein the tag data includes sensor data generated by a sensor coupled to the backscattering tag.

3. The system of claim 1 further comprising a backbone network path, and wherein the prior knowledge of the receiving unit of the pre-defined data payload is based on data received from the transmitting unit via the backbone network path.

4. The system of claim 1, wherein the transmitted frame includes a frame header configured to indicate whether the transmitted frame includes the pre-defined data payload.

5. The system of claim 1, wherein the backscattering tag is configured to encode the tag data by modifying a frequency of the signal received from the transmitting unit.

6. The system of claim 5, wherein the transmitting unit is configured to transmit the signal on a first frequency channel, the backscattering tag is configured to transmit the backscattered signal on a second frequency channel separate from the first frequency channel, and the receiving unit is configured to receive the backscattered signal on the second frequency channel.

7. The system of claim 1, wherein the backscattering tag is configured to encode the tag data by modifying an amplitude or a phase of the signal received from the transmitting unit.

8. A backscattering tag configured to:
   receive, from a transmitting unit, a transmitted signal comprising a transmitted frame with a pre-defined data payload;
   encode tag data over the pre-defined data payload to generate a modified data payload; and
   transmit, to a receiving unit, a backscattered signal comprising a backscattered frame comprising the modified data payload, the receiving unit being configured to decode the modified data payload to recover the tag data, wherein the decoding is based on prior knowledge of the receiver of the pre-defined data payload, the prior knowledge being based on data stored in a memory unit of the receiving unit.

9. A method for backscattered communication comprising:
   transmitting, by a transmitting unit, a signal comprising a transmitted frame including a pre-defined data payload;
   backscattering, using a backscattering tag device, the signal, wherein the backscattering includes:
      receiving, from the transmitting unit, the signal comprising the transmitted frame;
      encoding tag data over the pre-defined data payload to generate a modified data payload; and
      transmitting a backscattered signal comprising a backscattered frame including the modified data payload;
   receiving, by a receiving unit, the backscattered signal; and
   decoding, by the receiving unit, the modified data payload, in the backscattered frame, to recover the tag data, wherein the decoding is based on prior knowledge of the receiving unit of the pre-defined data payload, the prior knowledge being based on data stored in a memory unit of the receiving unit.

10. The method of claim 9, wherein the tag data includes sensor data generated by a sensor coupled to the backscattering tag.

11. The method of claim 9, wherein the prior knowledge of the receiving unit of the pre-defined data payload is based on data received from the transmitting unit via a backbone network path.

12. The method of claim 9, wherein the transmitted frame includes a frame header configured to indicate whether the transmitted frame includes the pre-defined data payload.

13. The method of claim 9, wherein the backscattering includes encoding the tag data by modifying a frequency of the signal received from the transmitting unit.

14. The method of claim 13, wherein the transmitting unit transmits the signal on a first frequency channel, the backscattering tag transmits the backscattered signal on a second frequency channel separate from the first frequency channel, and the receiving unit receives the backscattered signal on the second frequency channel.

15. The method of claim 9, wherein the backscattering tag encodes the tag data by modifying an amplitude or a phase of the signal received from the transmitting unit.

16. A method for backscattered communication comprising:
   receiving, by a backscattering tag from a transmitting unit, a transmitted signal comprising a transmitted frame including a pre-defined data payload;
   encoding, by the backscattering tag, tag data over the pre-defined data payload to generate a modified data payload; and
   transmitting, by the backscattering tag to a receiving unit, a backscattered signal comprising a backscattered frame including the modified data payload, the receiving unit being configured to decode the modified data payload to recover the tag data, wherein the decoding is based on prior knowledge of the receiver of the pre-defined data payload, the prior knowledge being based on data stored in a memory unit of the receiving unit.

* * * * *